United States Patent
Shimazaki et al.

[11] Patent Number: 6,160,950
[45] Date of Patent: Dec. 12, 2000

[54] METHOD AND APPARATUS FOR AUTOMATICALLY GENERATING A DIGEST OF A PROGRAM

[75] Inventors: Hiroaki Shimazaki; Junichi Komeno, both of Osaka, Japan

[73] Assignee: Matsushita Electric Industrial Co., Ltd., Osaka, Japan

[21] Appl. No.: 08/893,362

[22] Filed: Jul. 15, 1997

[30] Foreign Application Priority Data

Jul. 18, 1996 [JP] Japan .................................. 8-188976
Oct. 25, 1996 [JP] Japan .................................. 8-283486

[51] Int. Cl.[7] ............................................ H04N 5/76
[52] U.S. Cl. ............................ 386/46; 386/95; 386/96
[58] Field of Search ............................ 386/46, 68, 69, 386/70, 81–82, 96, 98, 95, 52, 54, 64; 348/7, 12, 13; 360/72.1, 72.3; 381/42, 43, 45; H04N 5/76, 5/09, 9/79

[56] References Cited

U.S. PATENT DOCUMENTS

| | | |
|---|---|---|
| 5,282,092 | 1/1994 | Wilhelms .................................. 360/5 |
| 5,428,774 | 6/1995 | Takahashi et al. ...................... 386/68 |
| 5,430,697 | 7/1995 | Bu . |
| 5,576,950 | 11/1996 | Tonomura et al. .................... 386/121 |
| 5,613,032 | 3/1997 | Cruz et al. ................................ 386/69 |
| 5,668,917 | 9/1997 | Lewine ..................................... 348/907 |
| 5,828,809 | 10/1998 | Chang et al. ............................ 386/68 |
| 5,832,171 | 11/1998 | Heist ........................................ 386/46 |
| 5,870,521 | 2/1999 | Shimoda .................................. 386/52 |

FOREIGN PATENT DOCUMENTS

| | | |
|---|---|---|
| 1224667 | 9/1989 | Japan . |
| 6218602 | 9/1994 | Japan . |

*Primary Examiner*—Thai Tran
*Attorney, Agent, or Firm*—Smith, Gambrell & Russell, LLP

[57] ABSTRACT

A video display method designates as a digest display portion a part of an entered video and audio signal said part of which has an audio signal having a specific characteristic, for example a large speech level, and displays such designated digest display portion.

23 Claims, 16 Drawing Sheets

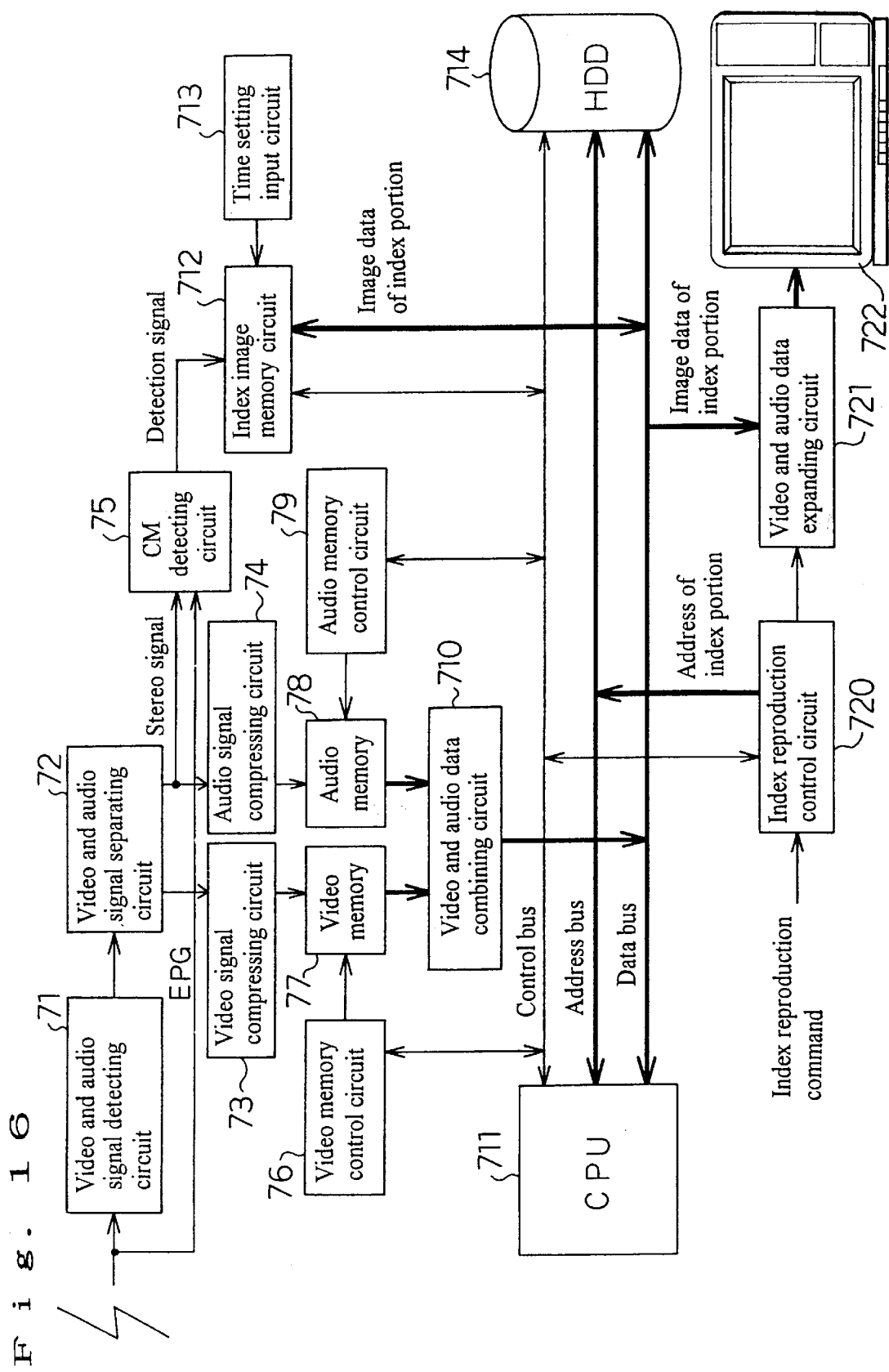

METHOD AND APPARATUS FOR AUTOMATICALLY GENERATING A DIGEST OF A PROGRAM

BACKGROUND OF THE INVENTION

1. Field of the Invention

The present invention relates to a video display device, and recording and reproducing apparatus in a magnetic disk, digital audio tape recorder, digital video tape recorder, or the like.

2. Related Art of the Invention

In a conventional VTR, when reproducing a recorded program, there was a recording and reproducing apparatus capable of reproducing at high speed such as double speed with sound, so that the recorded program may be reviewed in a short time. For example, when reproducing a recorded signal at a double speed, the video signal is reproduced at double speed, but the audio signal is cut off in a speechless period or a period of extremely low speech level, and by making use also of the cut-off blank period, the reproduced audio signal is extended in time in production, so that the speech may be heard easily.

Certain conventional audio tape recorders had a function of pausing the recording operation in a speechless portion when recording talking sound in a meeting or the like. In this case, the recording operation is started depending on the speech level, and therefore speech is not recorded in a period from detection of speech until ready to record. The problem is solved by temporarily storing the speech for a specific the before start of recording operation. Actually, however, recording is made by delaying sequentially while storing temporarily.

In such VTR, however, if it is possible to review at high speed, the program must be watched from the beginning till the end, and the unwanted portion must be watched, and it takes a considerably long time. For example, when a two-hour sports program is reproduced at double speed, it takes an hour to watch the whole, and the user is requested to be concentrated in this period.

In the above audio tape recorder, when the data is cut off at the moment of recording, the actually necessary portion may not be recorded. Since it is not recorded from the beginning, if it is found necessary later in relation to the preceding or succeeding portion, it is impossible to reproduce it.

In the light of such problems of the conventional recording and reproducing apparatus, it is an object of the invention to present a video display method, and recording and reproducing apparatus capable of reproducing only essential portions of an entered or recorded program in a digest form, so that the content of the program can be understood in a short time.

SUMMARY OF THE INVENTION

A video display method of the present invention is for designating as a digest display portion a part of an entered video and audio signal said part of which has an audio signal having a specific characteristic, and displaying such designated digest display portion.

In the invention, for example, by reproducing only essential points of a recorded program in a digest form, it is possible to understand the content of the program in a short time. In particular, by making a digest form on the basis of the speech level, in a sports program, only the portions of a large reaction of the audience watching in the stadium can be selectively reviewed.

Moreover, by using the continuous time of a large portion of speech level as the reference for making a digest form, only the reaction of the audience can be picked up, avoiding erroneous detection due to an incidental large level sound, such as a hitting sound in a ball game.

Still more, by detecting the digest portion at the reproduction side, a digest form suited to the taste of the user can be compiled by changing the detecting reference of the digest portions.

An image recording apparatus of the present invention comprises change detecting means for detecting a specific change from a video and audio signal, signal extracting means for extracting the video and audio signal in a specific time range on the basis of the time of detection of the change, time range setting means for setting the specific time range, and recording means for recording the audio and video signal extracted from the signal extracting means into a recording medium.

Thus in the present invention the digest display portions of a program can be easily extracted and recorded. Also the digest display portions of a program recorded in the recording medium can be reproduced easily.

BRIEF DESCRIPTION OF THE INVENTION

FIG. 16 is a block diagram of an image recording and reproducing apparatus having an image recording apparatus in embodiment 8 of the invention.

Figure 1:
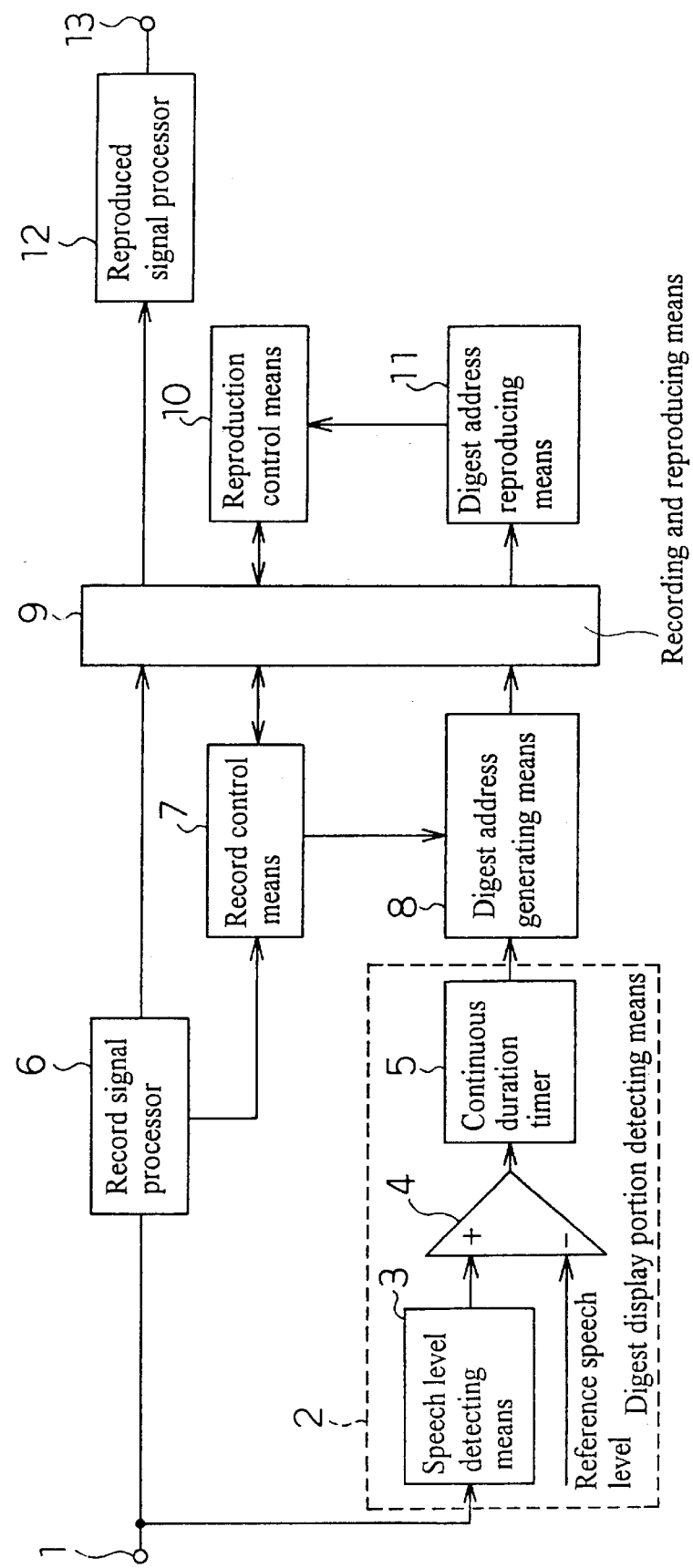
FIG. 1 is a block diagram of a recording and reproducing apparatus in embodiment 1 of the invention.

(Reference Numerals)
2, 53 Digest display portion detecting means
3, 23, 50 Speech level detecting means
4, 51 Comparator
5, 32, 52 Continuous duration timer
8 Digest address generating means
9, 26, 45 Recording and reproducing means
11 Digest address reproducing means
25 Record modulating means
30 Demodulating means
31 Comparing means
33 Digest reference display input means
41 Video and audio separator
61, 63 BEF
71 Video and audio signal detecting circuit
72 Video and audio signal separating circuit
75 CM detecting circuit
710 Video and audio data combining circuit
711 CPU
712 Index image memory circuit
713 Time setting input circuit
714 HDD
715 Index address memory circuit
716 Screen changeover detecting circuit
720 Index reproduction control circuit
721 Video and audio data expanding circuit

PREFERRED EMBODIMENTS

Referring now to the drawings, preferred embodiments of the invention are described in detail below.

(Embodiment 1)

FIG. 1 is a block diagram of a recording and reproducing apparatus in embodiment 1 of the invention. In FIG. 1, this recording and reproducing apparatus is composed of an input terminal 1 for receiving a video and audio signal containing a video signal and an audio signal, digest display portion detecting means 2 for detecting a digest display portion from the video and audio signal entered from the input terminal 1, a record signal processor 6 for processing the video and audio signal, recording and reproducing means 9 for recording and reproducing the video and audio signal, record control means 7 for controlling recording of the recording and reproducing means 9, digest address generating means 8 as record position generating means for generating record position information of the digest display portion, reproduction control means 10 for controlling reproducing of the recording and reproducing means 9, digest address reproducing means 11 for reproducing the record position information of the digest display portion, a reproduced signal processor 12 for processing the signal reproduced from the recording and reproducing means 9, and an output terminal 13 for issuing the reproduced signal.

Herein, part of the recording and reproducing means 9 composes the record position information recording means, and part of the recording and reproducing means and the reproduction control means 10 compose the reproducing means. The recording and reproducing means 9 comprises a recording medium for recording the video and audio signal and digest address. The digest display portion detecting means 2 is composed of speech level detecting means 3 for detecting speech level of audio signal as the quantity relating to a specific characteristic, a comparator 4 for comparing the detected speech level and reference speech level, and a continuous duration timer 5 for measuring a continuous duration when the output of the comparator 5 is over a specific level. In this embodiment, the recording medium is assumed to be a magnetic tape, but the type of the recording medium is not specified, and may include disk and other recording medium.

The operation of the above recording and reproducing apparatus of embodiment 1 is described below by referring to the drawings.

First, a video and audio signal entered from the input terminal 1 is fed into the record signal processor 6 and digest display portion detecting means 2. The record signal processor 6 performs format transform of input signal, error correction coding, and record modulation, and issues a signal showing timing of record signal (for example, a synchronizing signal of video signal) to the record control means 7. The record reproducing means 9 records the output signal from the record signal processor 6 into the recording medium according to the output signal from the record control means 7.

Figure 3:
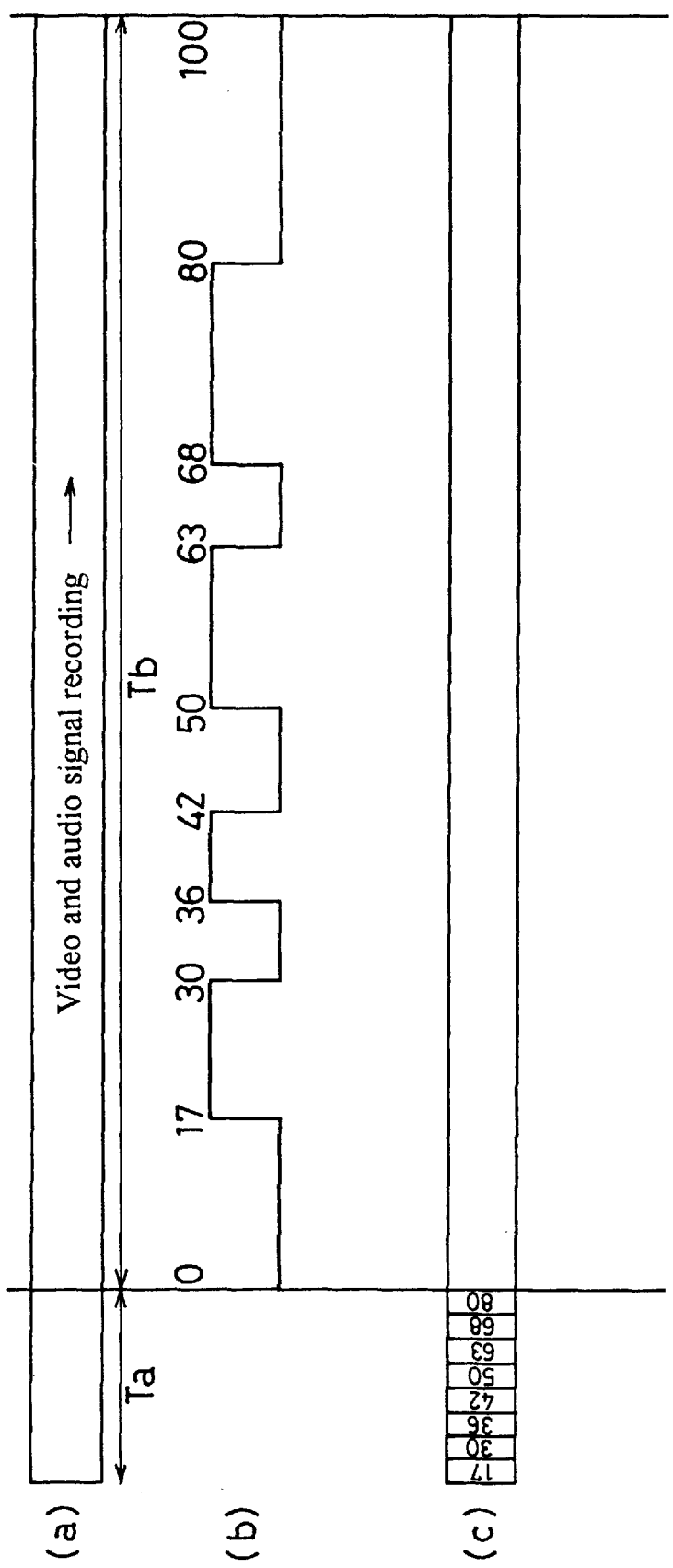
FIG. 3 is an explanatory diagram of an example of recording position of signal on a recording medium in embodiment 1.

Herein, FIG. 3 is a conceptual diagram for explaining the record position of signal on the recording medium, in which (a) in an image of a tape as a recording medium. The left side shows the beginning, and the right side the end, supposing the total record time to be Ta+Tb. The record control means 7 first feeds the tape fast by the portion of Ta, and then starts recording of input signal. The record control means 7 incorporates an address counter for determining the address showing the position of the tape in the longitudinal direction from the record start position, and starts counting simultaneously with start of recording, and issues the count value into the digest address generating means 8. For the ease of explanation, herein, it is supposed that the address is counted from 0 to 100 during the period of Tb.

On the other hand, from the input signal entered into the digest display portion detecting means 2, the speech level is detected by the speech level detecting means 3, and the detected speech level and reference speech level are compared in the comparator 4. The comparator 4 issues an output signal when the detected speech level is greater than the reference speech level, and the continuous duration timer 5 measures the continuous duration of the output signal.

Figure 2:
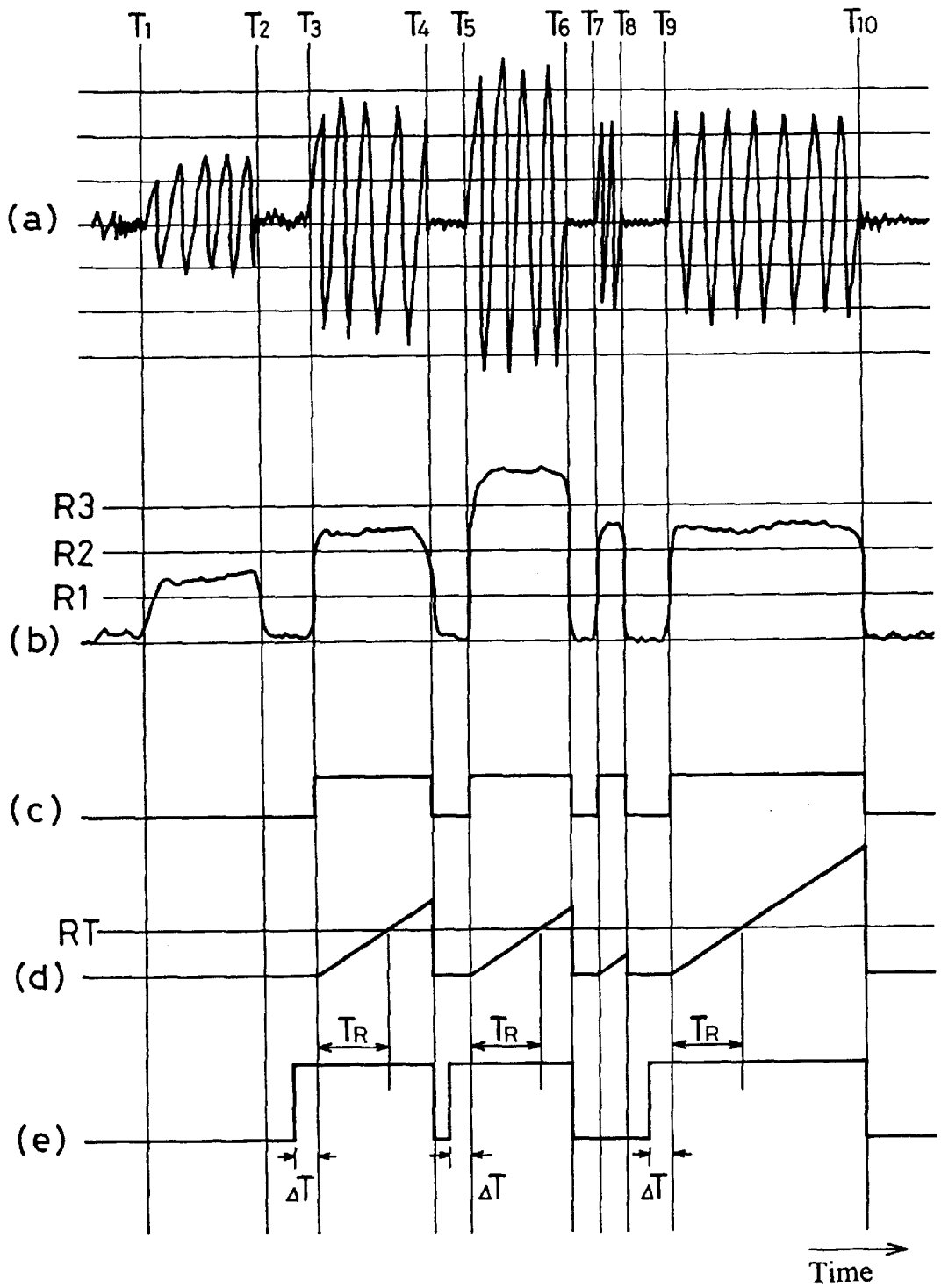
FIG. 2 is a diagram showing an example of signal waveform of parts of digest display portion detecting means in embodiment 1.

FIG. 2 is a conceptual diagram showing an example of signal waveforms of parts of the digest display portion detecting means 2. In FIG. 2, (a) is a waveform showing an input audio signal of the speech level detecting means 3, and (b) shows a speech level signal issued from the speech level detecting means 3, which is a waveform obtained by picking up only the low frequency signal by detecting the input audio signal. Diagram (c) shows an output signal of the comparator 4 when the reference speech level is supposed to be R2, which becomes H when the waveform (b) exceeds the level of R2. Diagram (d) shows time change of the value of the counter of the continuous duration timer 5, in which the axis of ordinates denotes the value of the counter in the continuous duration timer.

This continuous duration timer 5 is composed of a counter and several logic circuits, and resets the counter when the signal from the comparator 4 is L, and counts up by using a clock of specific frequency when H. The inclination of the waveform (d) when the input signal is H corresponds to the clock frequency. When the counter value is lager than a specific reference value, it shows that the H period of input signal is longer than the reference time (the time indicated as TR in (e)).

In (e), moreover, an output signal of the continuous duration timer 5 is shown, and when the waveform (d) exceeds the reference value RT (corresponding to the reference time), the portion of the input signal H is the portion of digest display. Herein, the H waveform of (e), that is, the portion of digest reproduction is started earlier than ΔT from the time when the speech level exceeds the reference. This is the consideration for the reaction time when the audience cheer up at a nice play.

It is actually impossible to start rise of signal earlier, and when composing the apparatus, in reality, it is necessary to delay the video and audio signal to be recorded by the timer longer than TR+ΔT.

The recording position of the signal into the tape is described. In this embodiment, as shown in FIG. 3, the record position of the portion of digest reproduction is recorded at the beginning portion Ta of the tape. FIG. 3 (b) is a diagram showing the position of video and audio signal on the tape as shown by the signal in FIG. 2 (e), and the portion of H is the time zone of digest reproduction. The start address and end address of this time zone are stored in the digest address generating means 8.

Diagram (c) shows an example of record position of digest address. As mentioned above, when recording of video and audio signal into the Tb portion of the tape is over, the record control means 7 rewinds the tape, and sequentially records the addresses stored in the digest address generating means 8 from the beginning of the beginning portion Ta of the tape.

When reproducing the digest portion, the digest address generating means 11 reproduces the beginning Ta of the tape through the recording and reproducing means 9, and reads in the address for digest reproduction, and according to this address, the reproduction control means 10 controls to reproduce only the portion of waveform H in FIG. 3 (b) from the recording and reproducing means 9. The reproduction signal issued from the recording and reproducing means 9 is demodulated into the video and audio signal in the reproduction signal processor 12, and is delivered from the output terminal 13.

Figure 4:
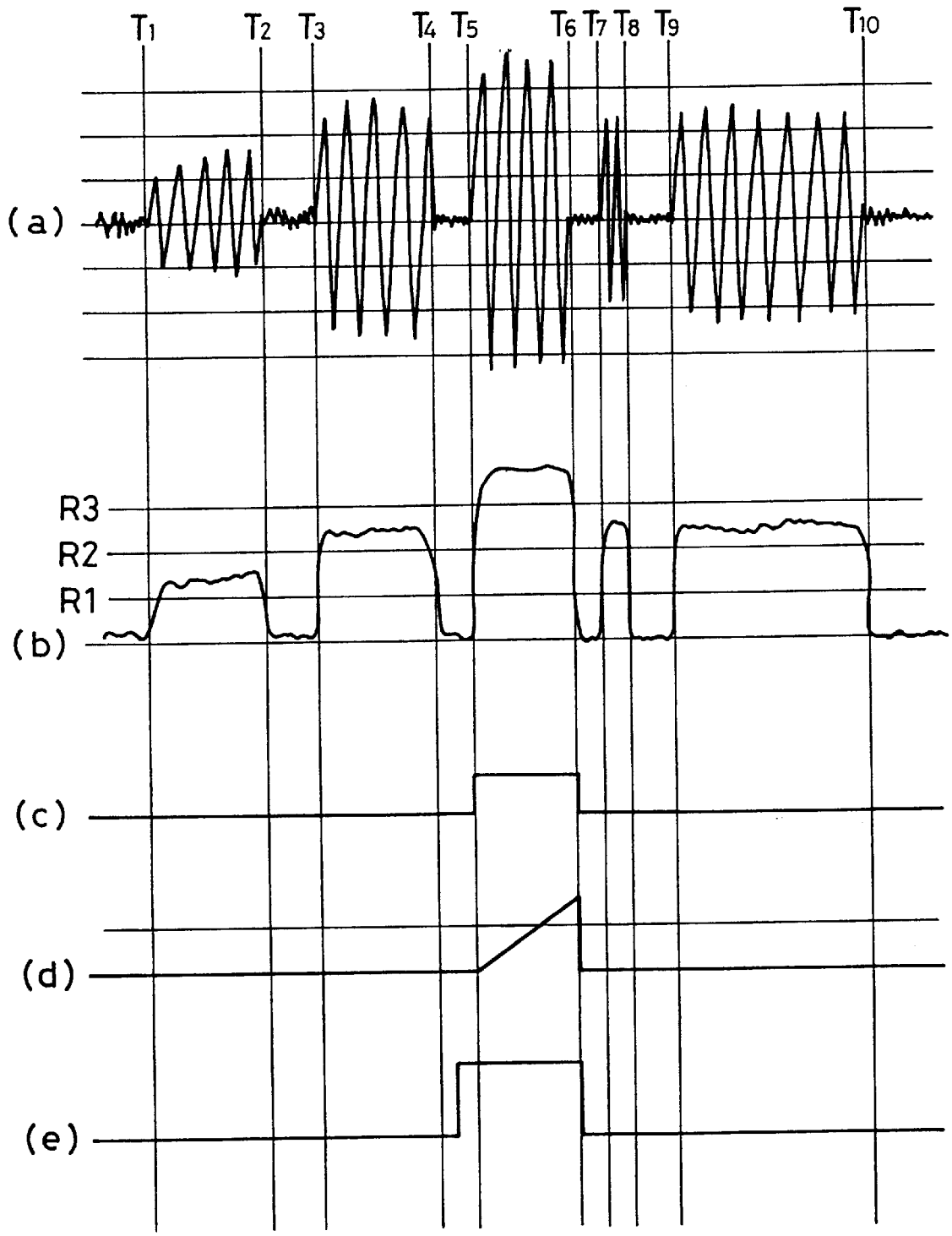
FIG. 4 is a diagram showing other example of signal waveform of parts of digest display portion detecting means in embodiment 1.

FIG. 4 is a diagram showing other example of signal waveforms of parts of the digest display portion detecting means in the embodiment. What differs from the signal waveform shown in FIG. 2 is the reference speech level to be entered into the comparator 4 is changed from R2 to R3. By thus changing the reference speech level, the number of portions of digest reproduction and the total digest reproduction time can be increased or decreased.

Although not shown in the drawing, also by changing the reference time TR shown in FIG. 2 (d), the time of each portion of digest reproduction and the total digest reproduction time can be changed. Of course, both can be changed. In this embodiment, however, change of reference speech level or reference time can be effected only in recording, and therefore the digest display portion in reproduction is fixed. (Embodiment 2)

Figure 5:
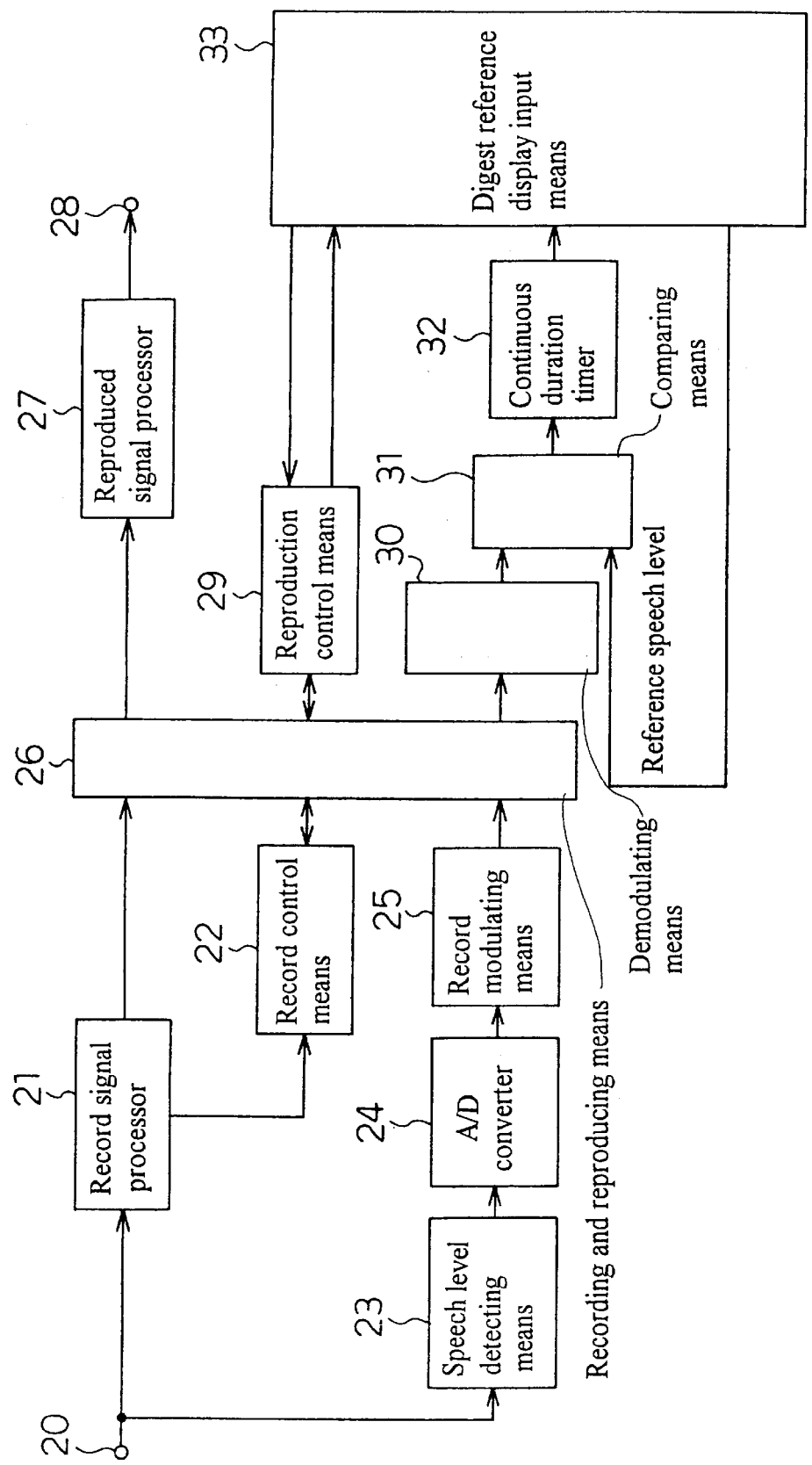
FIG. 5 is a block diagram of a recording and reproducing apparatus in embodiment 2 of the invention.

FIG. 5 is a block diagram of a recording and reproducing apparatus in embodiment 2 of the invention. In FIG. 5, this recording and reproducing apparatus is composed of an input terminal 20 for receiving a video and audio signal containing a video signal and an audio signal, speech level detecting means 23 as characteristic quantity detecting means for detecting the speech level of audio signal from the video and audio signal entered from the input terminal 20, an A/D converter 24 for converting the output analog signal of the speech level detecting means 23 into a digital signal, record modulating means 25 for modulating the output signal from the A/D converter 24, a record signal processor 21 for processing the video and audio signal, recording and reproducing means 26 for recording and reproducing the video and audio signal, record control means 22 for controlling recording of the recording and reproducing means 26, reproduction control means 29 for controlling reproducing of the recording and reproducing means 26, demodulating means 30 for reproducing and demodulating the speech level signal recorded in the recording medium of the recording and reproducing means 26, comparing means 31 for comparing the demodulated speech level and the reference speech level, a continuous duration timer 32 for measuring the continuous duration of the output of the comparing means 31, digest reference display input means 33 for changing the reference speech level to be entered in the comparing means 31, a reproduced signal processor 27 for processing the signal reproduced from the recording and reproducing means 26, and an output terminal 28 for issuing the reproduced signal.

Herein, part of the recording and reproducing means 26 and the record modulating means 25 compose the characteristic quantity recording means, part of the recording and reproducing means 26 and the demodulating means 30 compose the characteristic quantity reproducing means, and the comparing means 31 and continuous duration timer 32 compose the digest display portion detecting means. The digest reference display input means 33 also includes a digest time calculator not shown in the drawing. In this embodiment, the recording medium is assumed to be a disk, but the type of the recording medium is not specified, and may include tape and other recording medium.

The operation of the above recording and reproducing apparatus of embodiment 2 is described below by referring to the drawings.

Figure 6:
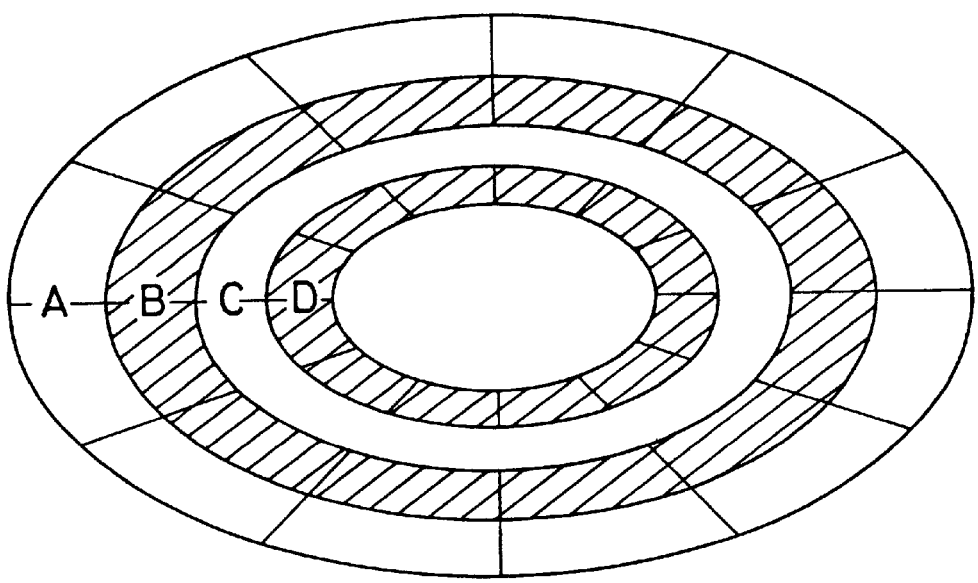
FIG. 6 is an explanatory diagram of an example of recording position of signal on a recording medium in embodiment 2.

FIG. 6 is a diagram explaining an example of recording position of signal on a recording medium in the embodiment. Herein, the signal quantized in speech level is recorded into a track adjacent to a track in which a video and audio signal is recorded. For example, a video and audio signal is recorded in track A, and a corresponding speech level signal is recorded in track B.

Figure 7:
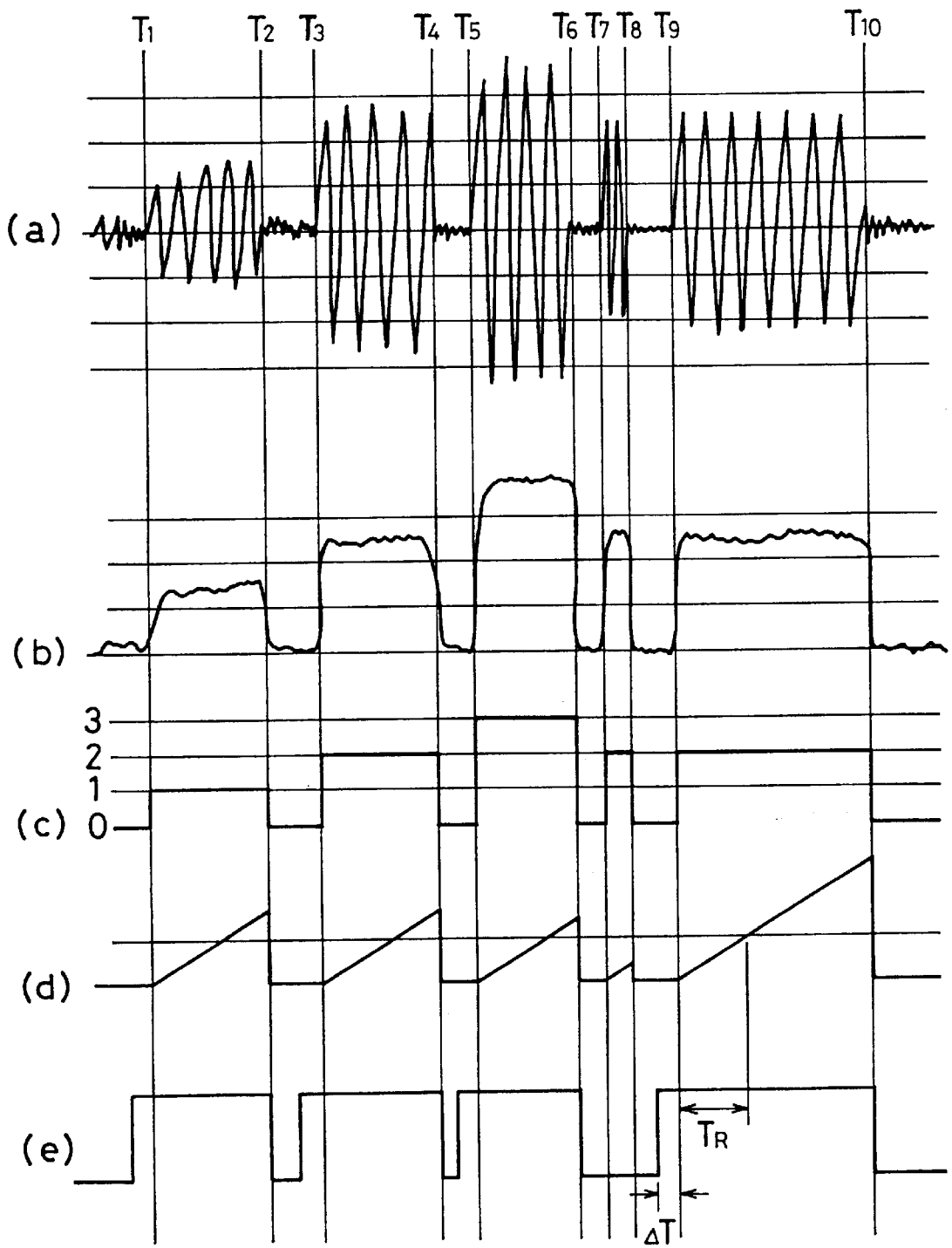
FIG. 7 is a diagram showing other example of signal waveform of parts of digest display portion detecting means in embodiment 2.

FIG. 7 is a diagram showing an example of signal waveform of parts of the digest display portion detecting means in the embodiment. In FIG. 7, (a) is a waveform showing an input audio signal of speech level detecting means 23, (b) shows a speech level signal issued from the speech level detecting means 23, which is a waveform obtained by picking up only low frequency signal by detecting the input audio signal. Diagram (c) shows an output signal from the A/D converter 24, showing an example in which quantizing is two bits. Diagram (d) shows time course changes of the counter value of the continuous duration timer 32.

Herein, in the comparing means 31, assuming "1" of two-bit value to be reference speech level, when the signal from the comparing means 31 is L, the counter is reset, and when H, the counter counts up by using a clock of specific frequency. Diagram (e) is an output signal of the continuous duration timer 5.

In this embodiment, by selecting the reference speech level among 1 to 3 of two-bit value, the number of times of digest reproduction portion and the total time are varied. Herein, plural reference speech levels are preliminarily calculated and displayed in the digest reference display input means 33, so that the user can select a desired reference speech level.

In the digest reference display input means 33, by setting the reference level or reference time, or both, the total time required for digest display is preliminarily calculated and displayed. Herein, the digest reference display input means 33 includes a digest number counter for preliminarily counting the number of digest display portions detected by the digest display portion detecting means, and by setting the reference level or reference time, or both, it may be designed to calculate and display preliminarily the number of times of digest display in one program.

Thus, in this embodiment, since the level of audio signal is recorded separately from the video and audio signal, and the digest display portion is detected from the speech level when reproducing, the display duration and number of times of digest display portion can be changed.

The recording and reproducing apparatus of the embodiment may be also provided with the following functions.

As for TR, ΔT, and reference speech level in FIG. 7, optimum values will change depending on the content of the program, that is, the type of sports (baseball, soccer, tennis, etc.) and the card of the game. On the other hand, in digital multichannel broadcast, the service information (SI hereinafter) showing the content of the program is transmitted as being multiplexed in the video and audio signal. Therefore, it is designed to set the reference level and/or reference time depending on the information such as genre of the program extracted from the SI (or to display the reference value).

Figure 8:
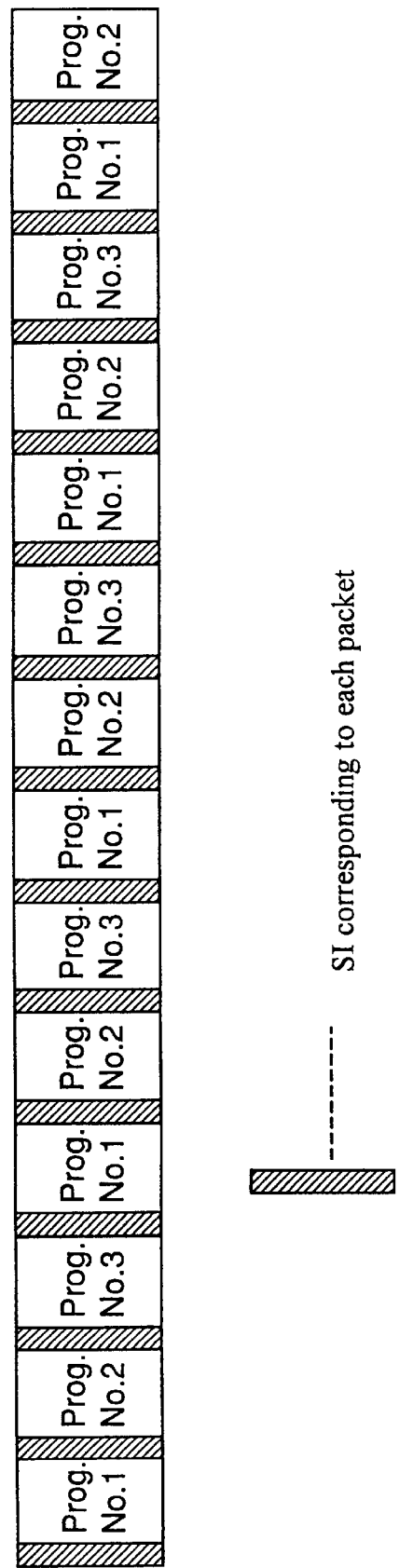
FIG. 8 is a diagram showing stream of digital multichannel broadcast in embodiment 2.

The SI as the program information signal is described below. FIG. 8 is a conceptual diagram showing stream of digital multichannel broadcast. Digital multichannel broadcast is realized regardless of transmission means such as ground wave, satellite, or cable. Herein, an example of digital satellite broadcast is explained.

In digital satellite broadcast, as shown in FIG. 8, programs of plural channels can be multiplexed and broadcast in the bit stream transmitted through each transponder.

In the bit stream in FIG. 8, channels 1 to 3 are multiplexed on the time axis. The lateral direction shows the elapse of time. The bit stream is divided into packets in every specific time, and program data of channels 1 to 3 are assigned in each packet. By collecting data of packet of Prog. No. 1, the broadcast content of channel 1 can be decoded. It is the same for channel 2 and channel 3.

In this way, multiple channels can be transmitted by one satellite, so that the transmission cost per channel can be lowered. Moreover, because of multiple channels, each channel may be presented as a specialty channel featuring programs of one specific genre only, so that service of wide selection can be presented according to the preferences of the users.

The data of each channel is composed of video signal, audio signal, and SI. In this embodiment, SI is a kind of program list, showing the information about the program being broadcast or to be broadcast in each channel. An example of SI content may include the title of the program, brief description of the content, date of broadcast, genre of the program, age restriction code, and broadcasting station name. By displaying such items of information at the receiving apparatus side, the program suited to the own taste of the user can be selected from multiple channels.

By extracting such SI, and determining the reference speech level to be entered into the comparing means 31 of the digest display portion detecting means, or determining the reference time of the continuous duration timer 32, by referring to this SI, an optimum digest display suited to the type of the program is enabled. In this case, both the reference speech level and reference time can be determined by the SI.

(Embodiment 3)

Figure 9:
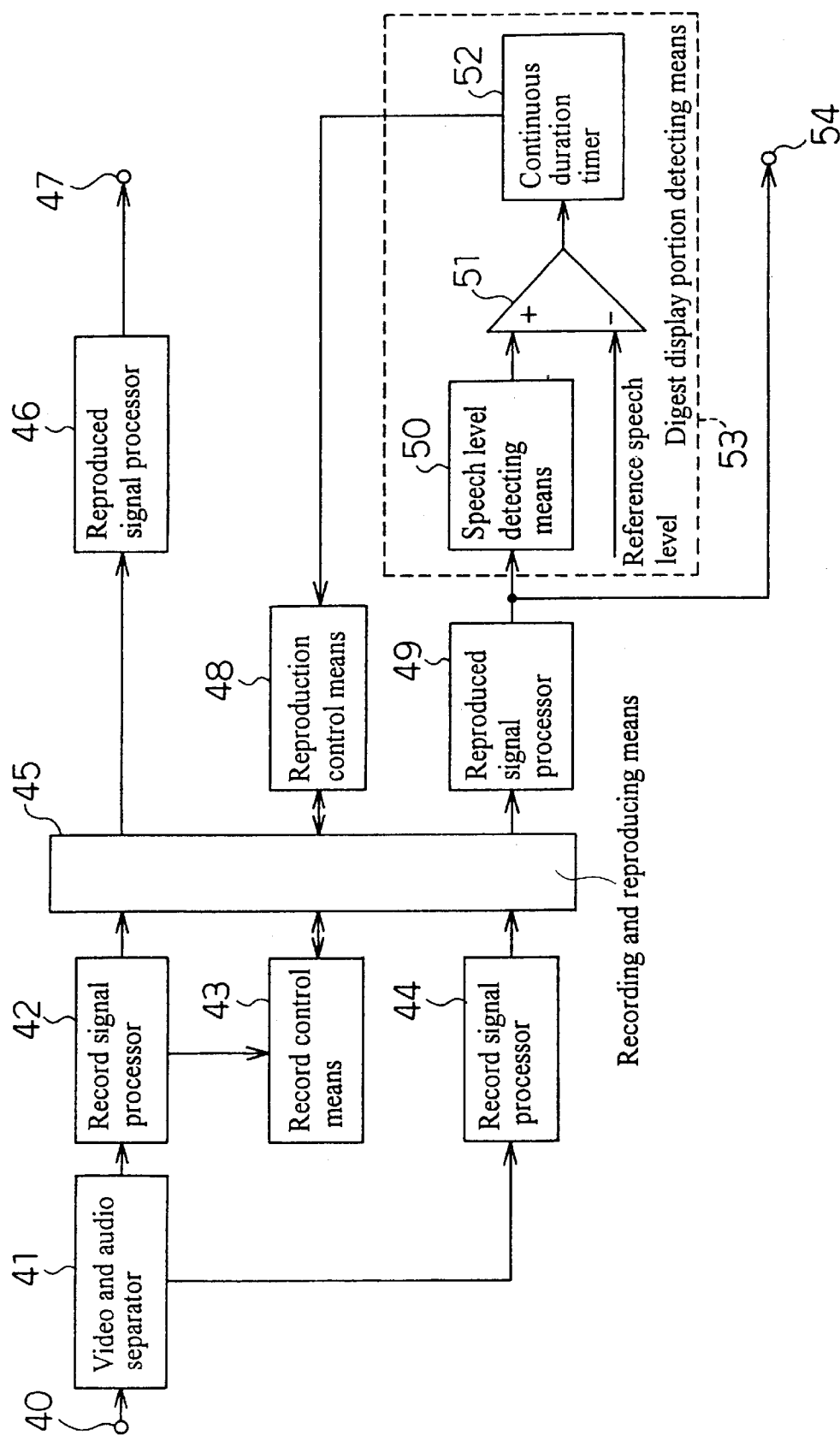
FIG. 9 is a block diagram of a recording and reproducing apparatus in embodiment 3 of the invention.

FIG. 9 is a block diagram of a recording and reproducing apparatus in embodiment 3 of the invention. In FIG. 9, this recording and reproducing apparatus is composed of an input terminal 40 for receiving a video and audio signal containing a video signal and an audio signal, a video and audio separator 41 for separating the entered video and audio signal into a video signal and an audio signal, a record signal processor 42 for processing the separated video signal, a record signal processor 44 for processing the separated audio signal, recording and reproducing means 45 for recording and reproducing video and audio signal, record control means 43 for controlling recording of the recording and reproducing means 45, reproduction control means 48 for controlling reproducing of the recording and reproducing means 45, a reproduced signal processor 46 for processing the video signal reproduced from the recording and reproducing means 45, a reproduced signal processor 49 for processing the audio signal reproduced from the recording and reproducing means 45, an output terminal 47 for issuing a reproduced video signal, an output terminal 54 for issuing are produced audio signal, and digest display portion detecting means for detecting the digest display portion again from the reproduced audio signal.

Herein, part of the recording and reproducing means 45 and reproduced signal processor 49 compose high speed reproducing means, and a comparator 51 and a continuous duration timer 52 compose digest display portion detecting means of claim 6. The recording and reproducing means 45 includes a disk as a recording medium for recording audio and video signals and digest addresses. The digest display portion detecting means 53 is composed of speech level detecting means 50 for detecting the speech level of audio signal, a comparator 51 for comparing the detected speech level and reference speech level, and a continuous duration timer 52 for measuring the continuous duration while the output of the comparator 51 is more than a specific value. The speech level detecting means 50 composes characteristic quantity detecting means.

In the foregoing embodiment 2, an extra recording capacity is needed in order to record the speech level signal aside from the video and audio signal, but in this embodiment, separating into video signal and audio signal, they are recorded in different positions on the recording medium, and only the audio signal is reproduced at high speed and the digest display portion is detected before reproducing the video signal (no detection is needed in recording). Herein, the record conFIG.uration of signals on the recording medium may be same as in embodiment 2, and, for example, video signals may be recorded in A and C, and audio signals in B and D in FIG. 6.

The embodiments are examples applied to the video and audio signals through the recording medium, but not limited to this, from the entered video and audio signal, for example, the quantity relating to the specific characteristic such as level of audio signal may be directly detected, the detected quantity and the reference quantity are compared, and on the basis of the result of the comparison, the audio and video signal corresponding to the portion having the specific characteristic may be designated as the digest display portion, and the designated digest display portions may be displayed sequentially. In this case, it is necessary to delay by temporarily storing the video and audio signal by using a memory or the like. Only the digest display portions may be displayed, or other video signals may be also displayed between displays of the digest display portions.

In the foregoing embodiments, the speech level is used as the quantity relating to the specific characteristic, but not limited to this, for example, any one of frequency, spectrum, and waveform feature of audio signal may be used, or combined with speech level.

Figure 10:
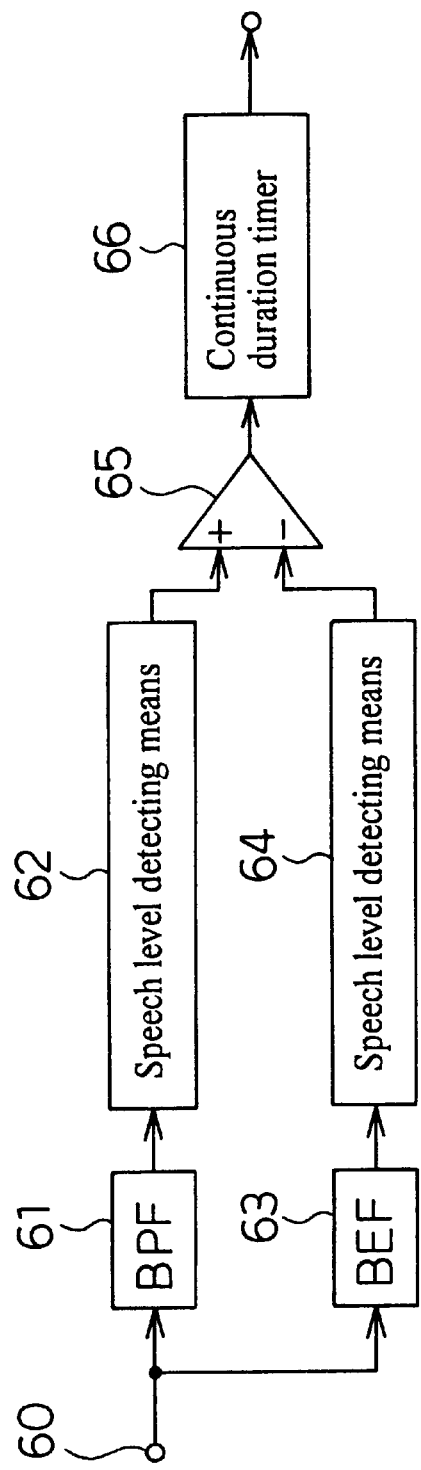
FIG. 10 is a structural diagram of digest display portion detecting means when using spectrum of sound signal.
Figure 11:
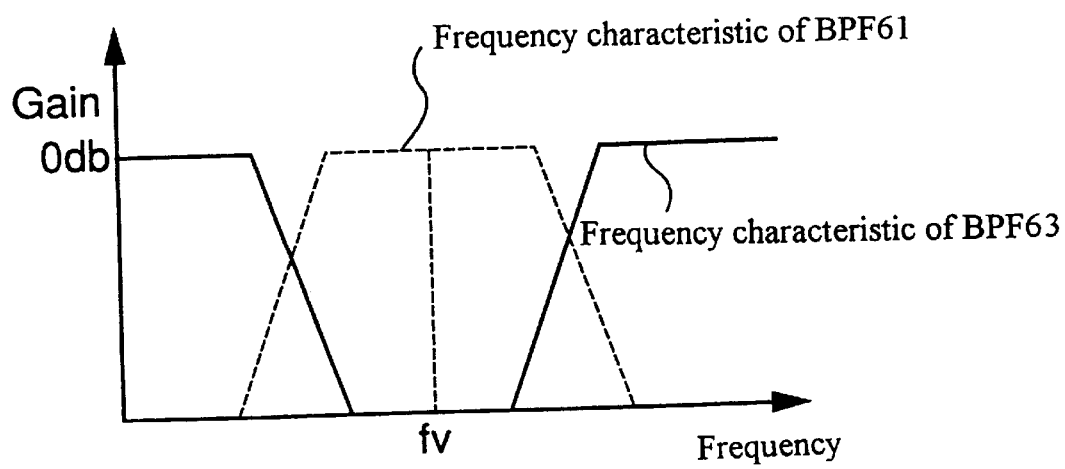
FIG. 11 is a diagram showing an example of frequency characteristic of band pass filter and band elimination filter in FIG. 10.

For example, when using the spectrum of audio signal, as shown in FIG. 10, a band pass filter (BPF) 61 for passing only the audio signal in the band close to the human voice, and a band elimination filter (BEF) 63 for eliminating the audio signal in the band close to the human voice are used. Examples of frequency characteristics of the BPF 61 and BEF 63 are shown in FIG. 11. In FIG. 11, fv denotes the central value of frequency of voice of audience of a sport. In FIG. 10, outputs of the BPF 61 and BEF 63 are detected of level in each passing band by speech level detecting means 62 and 64, respectively, and put into a comparator 65. The comparator 65 issues a high level H only when the output of the speech level detecting means 62 is larger than the output of the speech level detecting means 64, that is, the frequency portion corresponding to the voice of the audience is larger than other sound. In this constitution, inclusion of background music or the like into the digest portion may be avoided.

In the embodiments, as the digest display portions, the period of speech level higher than the reference speech level and continuing over a reference time, and a specific period before it are added, but not limited to this, the specific period before it may be excluded, or the period of speech level higher than the reference speech level and continuing over a reference time, and specific periods before and after it may be added as the digest display portions.

As clear from the description herein, in this invention, only essential points of entered or recorded program can be reproduced in a digest form, which brings about a benefit of understanding the content of the program in a short time.

The invention is further describe d below by referring to other embodiments together with the accompanying drawings.

(Embodiment 4)

Figure 12:
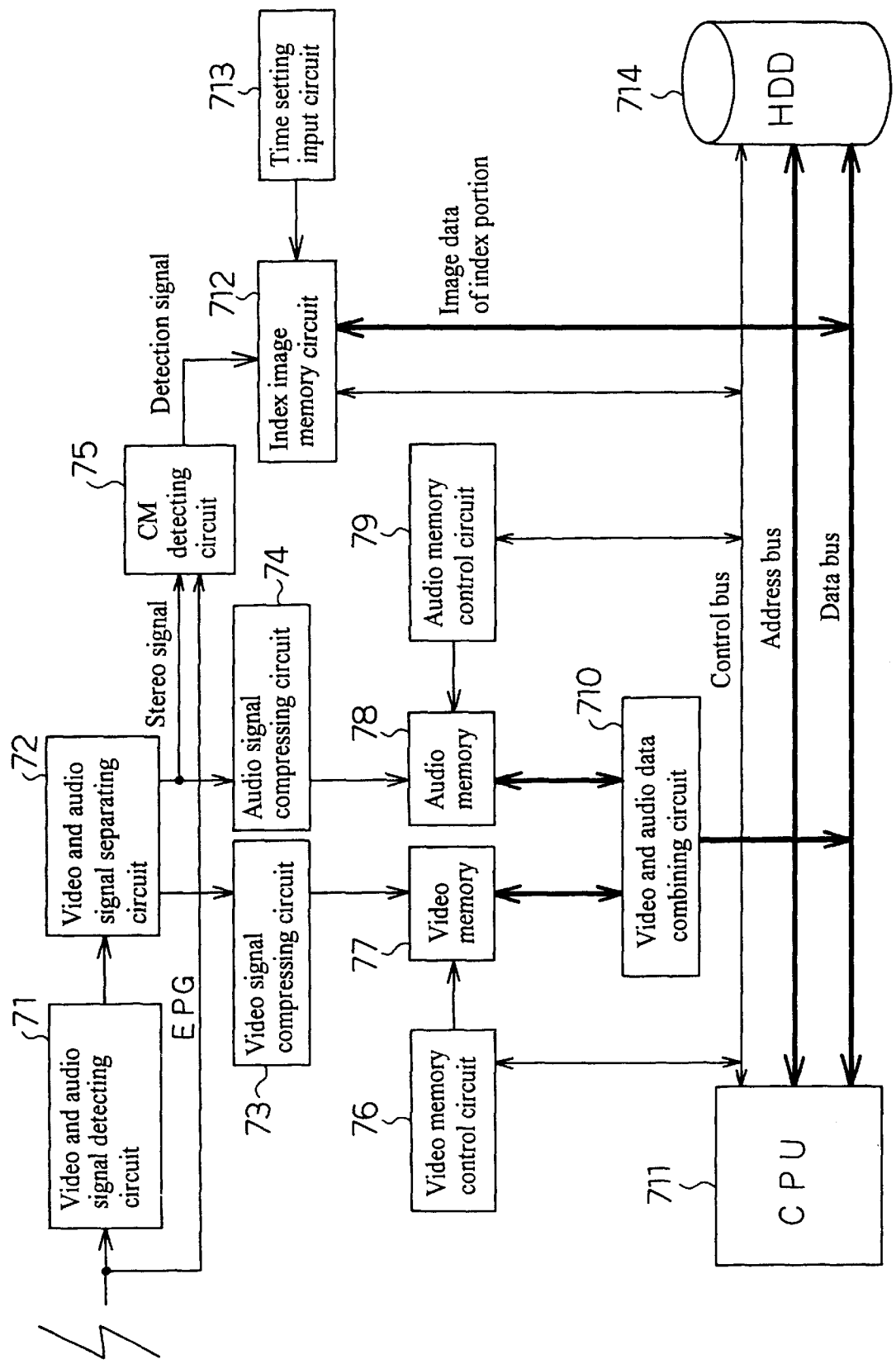
FIG. 12 is a block diagram of an image recording apparatus in embodiment 4 of the invention.

FIG. 12 is a block diagram of an image recording apparatus in embodiment 4 of the invention. In FIG. 12, this image recording apparatus is composed of a video and audio signal detecting circuit 71 for detecting a video and audio signal from an entered video signal, a video and audio signal separating circuit 72 for separating the detected signal into a video signal and an audio signal, a video signal compressing circuit 73 for compressing the separated video signal, an audio signal compressing circuit 74 for compressing the audio signal similarly, a CM detecting circuit 75 for detecting a CM (commercial message) from EPG (coded signal of program content and genre incorporated in the scanning lines) contained in the video signal, or from the stereo signal of audio signal, a video memory 77 for temporarily storing the compressed video signal, a video memory control circuit 76 for controlling the video memory 77, an audio memory 78 for temporarily storing the compressed audio signal, an audio memory control circuit 79 for controlling the audio memory 78, a video and audio data combining circuit 710 for combining data of the video memory 77 and audio memory 78, an index image memory circuit 712 for temporarily storing the index portion (highlight portion) of video and audio signal on the basis of the detection signal from the CM detecting circuit 75, a time setting circuit 713 for setting the time for the digest display portion to be stored in the index image memory circuit 712, a hard disk drive (HDD) 714 for recording the program data and index image data from the video and audio data combining circuit 710, and a CPU 711 for controlling these circuits.

Herein, the CM detecting circuit 75 is change detecting means or identification information detecting means, the index image memory circuit 712 is signal extracting means, the time setting input circuit 713 is the time range setting means, and the CPU 711 is the recording means.

The operation of the image recording apparatus in embodiment 4 is described below while referring to the drawings.

First, a video signal entered in the image recording apparatus for recording a certain program is fed into the video and audio signal detecting circuit 71, and a video and audio signal is detected. Herein, all of 525 scanning lines of the video signal do not express the video and audio signals, but some of them are used for text broadcasting, EPG (signal showing information of program content, genre, etc.), and other transmission, and this step is to extract video and audio signals from the 525 scanning lines.

Next, in the video and audio signal separating circuit 72, they are separated into video signals and audio signals by making use of difference in frequency band between picture and sound, and the separated signals are compressed in the video signal compressing circuit 73 and audio signal compressing circuit 74. The compressed video signal and audio signal are stored in the video memory 77 and audio memory 78. Herein, writing and reading of signals in the video memory 77 and audio memory 78 are controlled by the video memory control circuit 76 and audio memory control circuit 79. The video signal stored in the video memory 77 and the audio signal stored in the audio memory 78 are separately transferred to the data bus. The video and audio data combining circuit 710 store the transferred video signal and audio signal into the HDD 714 for one set of data (packet).

On the other hand, the audio signal separated in the video and audio signal separating circuit 72 is branched and put into the CM detecting circuit 75. In the CM detecting circuit 75, when the audio signal is changed from monaural to stereo, a detection signal is sent out into the index image memory circuit 712. When the ordinary program is monaural broadcasting, the CM (commercial message) broadcasting is changed to stereo, and by making use of this change, start of CM is recognized when the audio signal is changed to stereo. In FIG. 12, alternatively, by feeding the video signal directly into the CM detecting circuit 75 (in this case, the CM detecting circuit has a function for detecting EPG), the CM can be similarly detected by making use of the EPG. At this time, the EPG must be a code for CM, which is possible in the future.

On the other hand, by the time setting input circuit 713, it is possible to set the time range of the image to be recorded as index, such as the image 1 minute after CM detection, image 2 minutes before CM detection, image how many minutes before or after on the basis of the time for detecting the CM, or the image for how many seconds from how many minutes after CM detection.

Next, the index image memory circuit 712 stores intake of image data for certain seconds from certain seconds, for example, after CM detection through the data bus, on the basis of the detection signal from the CM detecting circuit 75 and the time information from the time setting input circuit 713. In this way, index image is stored in very CM, and when recording of this program is over, the index image data (generally, plural sets of data) stored in the index image memory circuit 712 are stored together in a region different from the region of recording the whole program in the HDD 714.

(Embodiment 5)

Figure 13:
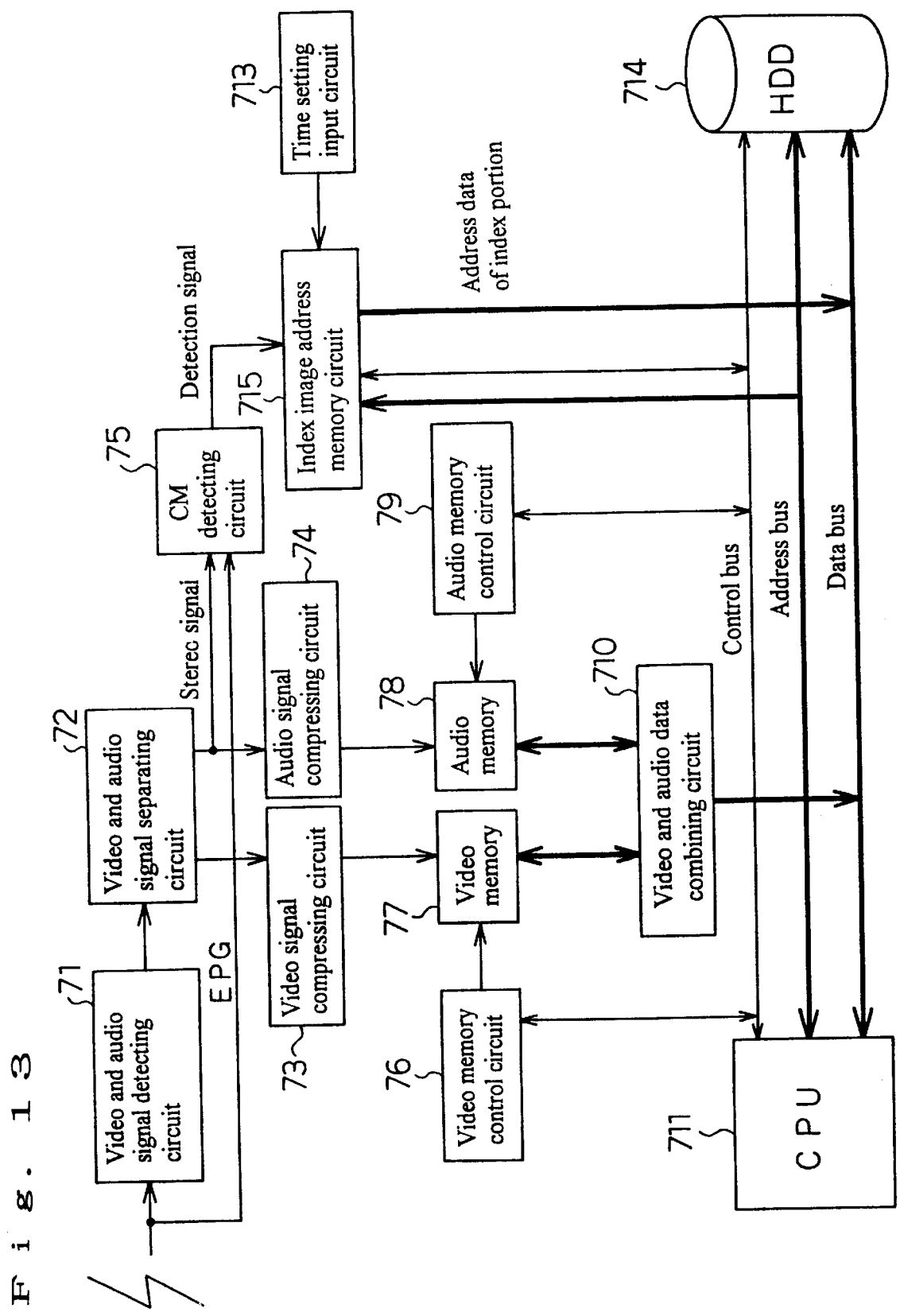
FIG. 13 is a block diagram of an image recording apparatus in embodiment 5 of the invention.

FIG. 13 is a block diagram of an image recording apparatus in embodiment 5 of the invention. In FIG. 13, what the image recording apparatus of the embodiment differs from the image recording apparatus in embodiment 4 lies in that an index image address memory circuit 715 is provided instead of the index image memory circuit 712. The other constitution is same as in FIG. 12, and overlapped explanations are omitted.

Herein, the CPU 711, part of HDD 714 and others compose a recording section, the index image address memory circuit 715 composes address generating means, and the CPU 711 and others compose the address memory means.

In the image recording apparatus of the embodiment, on the basis of the detection signal issued from the CM detecting circuit 75, and the time information issued from the time setting input circuit 713, the index image address memory circuit 715 takes in and stores the address in the HDD 714 corresponding to the video and audio data for certain seconds from certain seconds, for example, from detection of CM, through the address bus when writing into the HDD 714 from the video and audio data combining circuit 710. In this way, the address data of index image is stored in every detection of CM, and when recording of this program is over, the address data of index image (generally, plural sets of data) stored in the index image address memory circuit 715 are stored together in a region different from the region of recording the whole program in the HDD 714.

(Embodiment 6)

Figure 14:
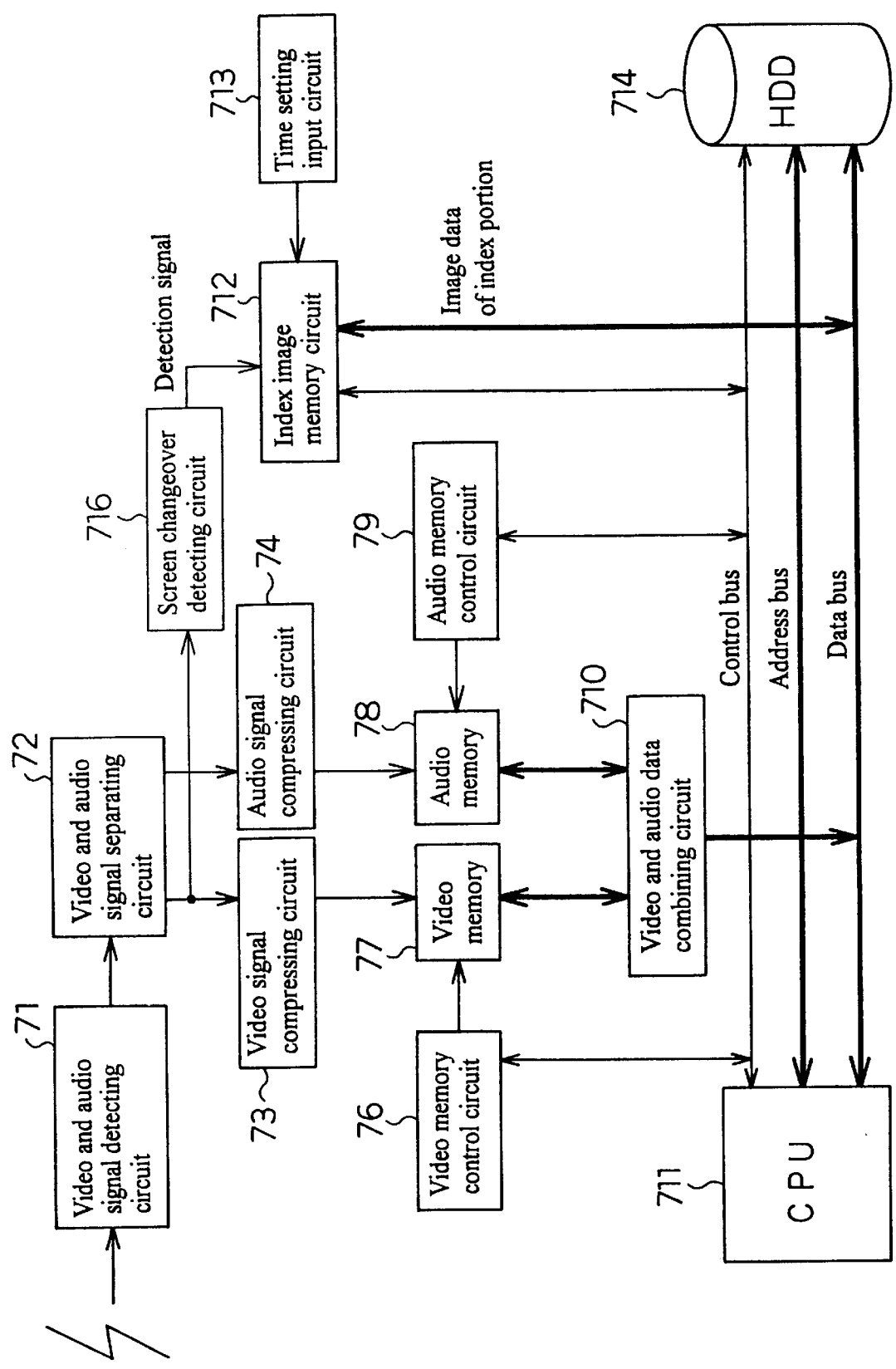
FIG. 14 is a block diagram of an image recording apparatus in embodiment 6 of the invention.

FIG. 14 is a block diagram of an image recording apparatus in embodiment 6 of the invention. In FIG. 14, what the image recording apparatus of the embodiment differs from the image recording apparatus in embodiment 4 in FIG. 12 lies in that a screen changeover detecting circuit 716 is provided instead of the CM detecting circuit 75 as the change detecting means. This screen changeover detecting circuit 716 detects a large change of screen scene by making use of the Video signal separated by the video and audio signal separating circuit 72, and this detection signal is sent out into the index image memory means 712. The other constitution is same as in FIG. 12, and overlapped explanations are omitted.

Generally, a large change in the screen scene is regarded to be related with change of program content or change of scene, and by detecting the change upon screen changeover, the images before and after may be used as index images, so that the digest display portion of the program may be adequately obtained.

(Embodiment 7)

Figure 15:
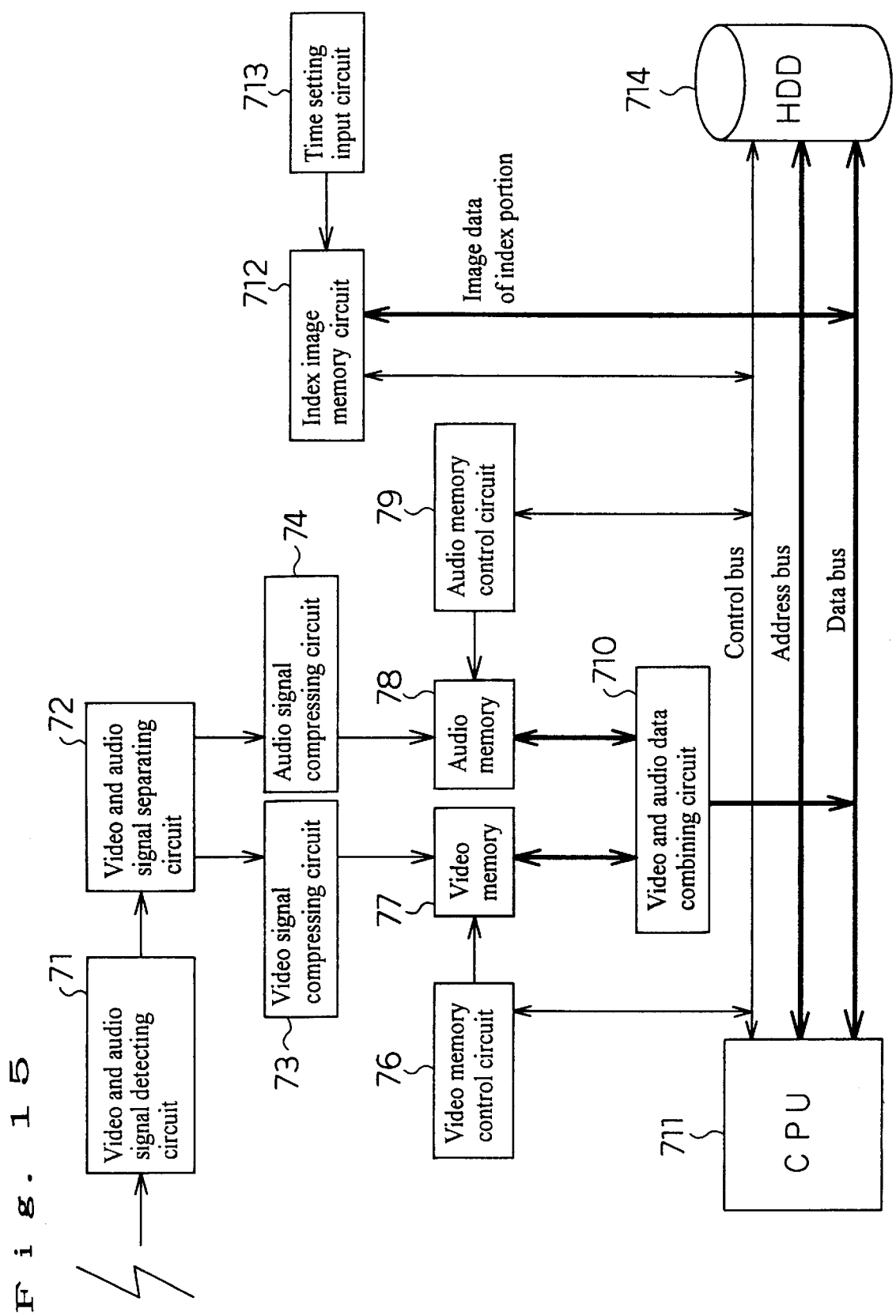
FIG. 15 is a block diagram of an image recording apparatus in embodiment 7 of the invention.

FIG. 15 is a block diagram of an image recording apparatus in embodiment 7 of the invention. In FIG. 15, what the image recording apparatus of the embodiment differs from the image recording apparatus in embodiment 4 in FIG. 12 lies in that the CM detecting circuit 75 as change detecting means is omitted. In this embodiment, the index image is extracted only by the time information set by the time setting input circuit 713. This is for setting the time suited to the content of the program or feature of the genre, and for example, in an action movie, the digest display portion can be set in the ending portion of the program, or in a suspense drama, the starting portion of a program may be set as the digest display portion, and when a proper intermediate time of a program is also set, index images may be obtained only by setting the time. Of course, plural time setting portions are provided in one program.

(Embodiment 8)

FIG. 16 is a block diagram of an image recording and reproducing apparatus having an image reproducing apparatus in embodiment 8 of the invention. In FIG. 16, the embodiment is realized by adding an image reproducing apparatus to the image recording apparatus in embodiment 4 in FIG. 12. That is, the constitution of the embodiment comprises, in addition to the image recording apparatus in FIG. 12, further an index reproduction control circuit 720 for issuing the address of the index portion in the HDD 714 by index reproduction command, and a video and audio data expanding circuit 721 for decoding data by expanding the video and audio data being read out from the index image recording region of the HDD 714 by using the address of the index portion. The expanded video and audio data is displayed on the screen of the monitor 722. Herein, part of the index reproduction control circuit 720 and video and audio data expanding circuit 721 compose the reproducing means. In this embodiment, therefore, as explained in embodiment 7, first, the index images of the digest display portions of the program to be recorded are recorded in a region different from the record region of the entire program in the HDD 714. Then, when reviewing the recorded index images, by feeding the index reproduction command, the index reproduction control circuit 720 is started up, and the index images are read out from the HDD 714, and expanded by the video and audio data expanding circuit 721, and are displayed on the monitor screen.

Herein, as the display method of index image, aside from the method of displaying the digest display portion images sequentially in the recorded sequence, only the first frame is displayed for one digest display portion (if the digest display portion is composed of plural images), and the feed button is manipulated to display one frame of next digest display portion, or the first one scene of each one of plural digest display portions may be displayed on a multi-screen. By employing such display method, further by disposing selection means for selecting to display whole images of which digest display portion, it is possible to display the images of only desired digest display portion. This selection means is not shown in the drawing, but it may be realized easily by connecting to the index reproduction control circuit 720 to control the address of the index portion.

Besides, in the constitution for recording the address of the index portion in the HDD 714, address range selecting means for selecting the address range corresponding to the desired video and audio signal is provided, and the address range of the index is readout from the HDD 714, and according to the address, the data in the digest display portion of the program recorded in the HDD 714 is read out, expanded, and displayed on the monitor screen.

In the embodiments 4 to 8, the data of the program itself and the data of the index portion are both recorded in the common recording medium, that is, the HDD 714, but the individual data may be recorded in different recording media.

In the constitution in FIG. 12, FIG. 13 and FIG. 16, the CM detecting circuit 75 is designed to detect the CM by both stereo signal and EPG, but it may be also constituted to use either one of them.

In embodiment 8, the image reproducing apparatus is added to the image recording apparatus, but, not limited to this, only the image reproducing apparatus may be constituted.

In the embodiment 1 the, magnetic tape is used as the recording medium and in the embodiments 2 to 8, the HDD is shown as the recording medium, but not limited to these, magneto-optical disk and other recording media may be used. In the case of a magnetic tape, in particular it may be considered to record the image data of the index portion at the end to the contrary of the embodiment 1.

In the foregoing embodiments, to generate the address range of the images of the digest display portions (index portions), on the basis of the time for detecting the specified change of the video and audio signal, specified time range is set, and the detection time and specified time range are used, but instead, on the basis of the address when detecting specified change of the video and audio signal, address range setting means is provided instead of the time setting input circuit, and the specified address range is set, and the address range of the image of the digest display portion may be generated by the address at the time of detection and the specified address range.

In the embodiments 4 to 8, the EPG derived from the image signals is used but the SI of FIG. 8 can be used instead of it.

On the contrary in the embodiments 1–3, the EPG can be used instead of the SI.

As clear from the description herein, it is a benefit of the invention that the digest display portions of a program can be easily extracted and recorded. It is also an advantage of the invention that the digest display portions of a program recorded in the recording medium can be reproduced easily.

What is claimed is:

1. A video display method for designating as a digest display portion a part of an entered video and audio signal, said part of which has an audio signal having a specific characteristic, and displaying such designated digest display portion, and wherein other video signals are displayed between displays of designated digest display portions, said other video signals being a part of an entered video and audio signal prior to and leading to said specific characteristic.

2. A recording and reproducing apparatus comprising characteristic quantity detecting means for detecting quantity relating to a specific characteristic of an audio signal of an entered video and audio signal, recording means for recording the entered video and audio signal, and for recording the quantity relating to the detected specific characteristic at a specific position having specific relation with the recorded position of the entered video and audio signal of the recording medium, a characteristic quantity reproducing means for reproducing the quantity relating to the specific characteristic from the recording medium, digest display portion detection means for detecting the video and audio signal corresponding to the portion having a specific characteristic on the basis of the quantity relating to the reproduced specific characteristic as digest display portion, and reproducing means for reproducing at least the detected digest display portion.

3. A recording and reproducing apparatus of claim 2, wherein the characteristic quantity reproducing means reproduces all quantity relating to the specific characteristic before reproduction of the video and audio signal is started, further comprising digest reference display input means for changing by the user the value of the specified reference quantity and/or specified reference time, including a digest time calculating unit for preliminarily calculating the time occupied by each digest display portion detected by the digest display portion detecting means and/or total time.

4. A recording and reproducing apparatus of claim 2, wherein the characteristic quantity reproducing means reproduces all quantity relating to the specific characteristic before reproduction of the video and audio signal is started, further comprising digest reference display input means for changing by the user the value of the specified reference quantity and/or specified reference time, including a digest number calculating unit for preliminarily calculating the number of digest display portions detected by the digest display portion detecting means.

5. A recording and reproducing apparatus of claim 2, wherein the digest display portion detecting means obtains portion having the specific characteristic, by comparing the quantity relating to the specific characteristic and a spec reference quantity.

6. A recording and reproducing apparatus comprising separating means for separating an entered video and audio signal into video signal and audio signal, recording means for recording the separated video signal and audio signal at different positions on a recording medium, high speed reproducing means for reproducing only the audio signal at high speed before reproducing the video and audio signal from the recording medium, characteristic quantity detecting means for detecting the quantity relating to a specific characteristic of the audio signal reproduced at high speed, digest display portion detecting means for detecting the video and audio signal corresponding to the portion having a specific characteristic on the basis of the quantity relating to the detected specific characteristic as digest display portion, and reproducing means for reproducing at least the detected digest display portion.

7. A recording and reproducing apparatus of claim 6, wherein the digest display portion detecting means obtains a portion having the specific characteristic, by comparing the quantity relating to the specific characteristic and a specific reference quantity.

8. A recording and reproducing apparatus comprising digest display portion detecting means for detecting as a digest display portion a part of an entered video and audio signal, said part of which has an audio signal having a specific characteristic, record position generating means for generating record position information showing a record position of the detected digest display portion on a recording medium, record position information recording means for recording the generated record position information at a specified position on the recording medium, and reproducing means for reproducing at least the digest display portion from the video and audio signal recorded in the recording medium, on the basis of the recorded record position information, wherein the digest display portion detecting means obtains a portion having the specific characteristic by comparing the quantity relating to the specific characteristic and a specific reference quantity, wherein the digest display portion detecting means detects the digest display portion only when the portion having the specific characteristic is detected continuously for a time longer than a specific reference time.

9. A recording and reproducing apparatus of claim 8, wherein the quantity relating to the specific characteristic is the speech level of audio signal, and the digest display portion detecting means detects the portion of which speech level of audio signal is lager than a specific reference speech level as the portion having the specific characteristics.

10. A recording and reproducing apparatus of claim 8, wherein the quantity relating to the specific characteristic is any one of level, frequency, spectrum, and waveform feature in the audio signal, or a combination thereof.

11. A recording and reproducing apparatus of claim 8, wherein the reproducing means reproduces the video and audio signal containing a specific time portion continuous before or after the digest display portion, as a new digest display portion.

12. An image recording apparatus comprising commercial message detecting means for detecting a commercial message part from a video and audio signal, signal extracting means for extracting the video and audio signal in a specific time range set by the time range setting means on the basis of the time of detection of the commercial message, time range setting means for setting the specific time range that is set before or after the time of detection of the commercial message.

13. A recording and reproducing apparatus claim 2, wherein the video and audio signal to be entered is a signal multiplexed with program information signal showing further information about the program content, and the digest display portion detecting means determines the value of the specified reference quantity and/or reference time by reference to the program information signal.

14. An image recording apparatus comprising a recorder for recording a video and audio signal, commercial message detecting means for detecting a commercial message part from the video and audio signal, address generating means for generating an address range in the recorder of the video and audio signal in a specific time range set by the time range setting means on the basis of the time of detection of the commercial message, time range setting means for setting the specific time range that is set before or after the time of detection of the commercial message.

15. An image recording apparatus of claim 14, wherein the commercial message part is detected by checking a change from monaural signal to stereo signal of the audio signal of the video and audio signal.

16. An image recording apparatus of claim 12 or 14, wherein the commercial message part is detected by checking a change from monaural signal to stereo signal of the audio signal of the video and audio signal.

17. An image recording apparatus comprising identification information detecting means for receiving an audio and video signal containing a commercial message and identification information for identifying a program, and for detecting the commercial message using the identification information, signal extracting means for extracting the video and audio signal in a specific time range set by a time range setting means on the basis of the time of detection of the commercial message, time range setting means for setting the specific time range that is set before or after the time of detection of the commercial message, and recording means for recording the video and audio signal extracted by the signal extracting means into a recording medium.

18. An image recording apparatus comprising a recorder for receiving an audio and video signal containing a commercial message and identification information for identifying a program, and recording the video and audio signal, identification information detecting means for detecting the commercial message using the identification information, address generating means for generating an address range in the recorder of the video and audio signal in a specific time range on the basis of the time of detection of the commercial message, time range setting means for setting the specific time range, and address recording means for recording address range information generated by the address generating means into a recording medium.

19. An image recording apparatus comprising time range setting means for setting one or more specific time ranges for a specific program, signal extracting means for extracting a part from the entered video and audio signal of the program on the basis of the set specified time range, and recording means for recording the extracted video and audio signal into a recording medium.

20. An image recording apparatus comprising a recorder for recording a video and audio signal of a specific program, time range setting means for setting one or more specific time ranges for the specific program, address generating means for generating an address range in the recorder of the audio and video signal in the specified time range on the basis of the set specified time range, and address recording means for recording the address range information generated by the address generating means in a recording medium.

21. An image recording apparatus comprising commercial message detecting means for detecting a commercial message part from a video and audio signal, address range setting means for setting a specific address range that is either before or after the address of detection of the commercial message, address generating means for generating an address range in a specific address range set by an address range setting means on the basis of the address on the video and audio signal of which the commercial message is detected, address range setting means for setting the specific address range that is set before or after the address of detection of the commercial message, and address recording means for recording the address range generated by the address generating means into a recording medium.

22. An image reproducing apparatus comprising selecting means for selecting a desired video and audio signal from plural video and audio signals, extracted and recorded in the image recording apparatus of claim 12, and reproducing means for reproducing the selected audio and video signal.

23. An image reproducing apparatus comprising address range selecting means for selecting and address range corresponding to a desired video and audio signal from plural pieces of address range information recorded in the image recording apparatus of claim 14, and reproducing means for reproducing the audio and video signal recorded in the recorder on the basis of the selected address range.

* * * * *